United States Patent [19]

Restad et al.

[11] 4,046,391
[45] Sept. 6, 1977

[54] STAIR CLIMBING AND DESCENDING ATTACHMENT FOR A HAND TRUCK

[75] Inventors: Everett L. Restad, Faribault; Roger W. Pitan, Medford, both of Minn.

[73] Assignee: Nutting Truck and Caster Company, Faribault, Minn.

[21] Appl. No.: 695,582

[22] Filed: June 14, 1976

[51] Int. Cl.² ............................................. B62B 1/04
[52] U.S. Cl. ............................... 280/5.24; 280/47.27
[58] Field of Search ............ 280/5.2, 5.24, 28, 12 M, 280/47.33, 47.27; 180/8 A

[56] References Cited

U.S. PATENT DOCUMENTS

| 2,263,879 | 11/1941 | Jorgensen | 280/5.24 |
| 2,467,644 | 4/1949 | Wright | 280/5.24 |

FOREIGN PATENT DOCUMENTS

| 206,446 | 7/1956 | Australia | 280/47.27 |
| 475,876 | 9/1969 | Switzerland | 280/47.27 |

*Primary Examiner*—Joseph F. Peters, Jr.
*Assistant Examiner*—R. Schrecengost
*Attorney, Agent, or Firm*—Dorsey, Windhorst, Hannaford, Whitney & Halladay

[57] ABSTRACT

The present invention is an attachment for a hand truck. The attachment comprises two truss members welded to the hand truck and two elongated rail members, each secured to one of the truss members. The rail members each include an elongated slide of an ultra-high molecular weight polymer which provide a low-friction surface for slidably supporting the hand truck on the edge of a stair.

6 Claims, 3 Drawing Figures

U.S. Patent   Sept. 6, 1977   4,046,391
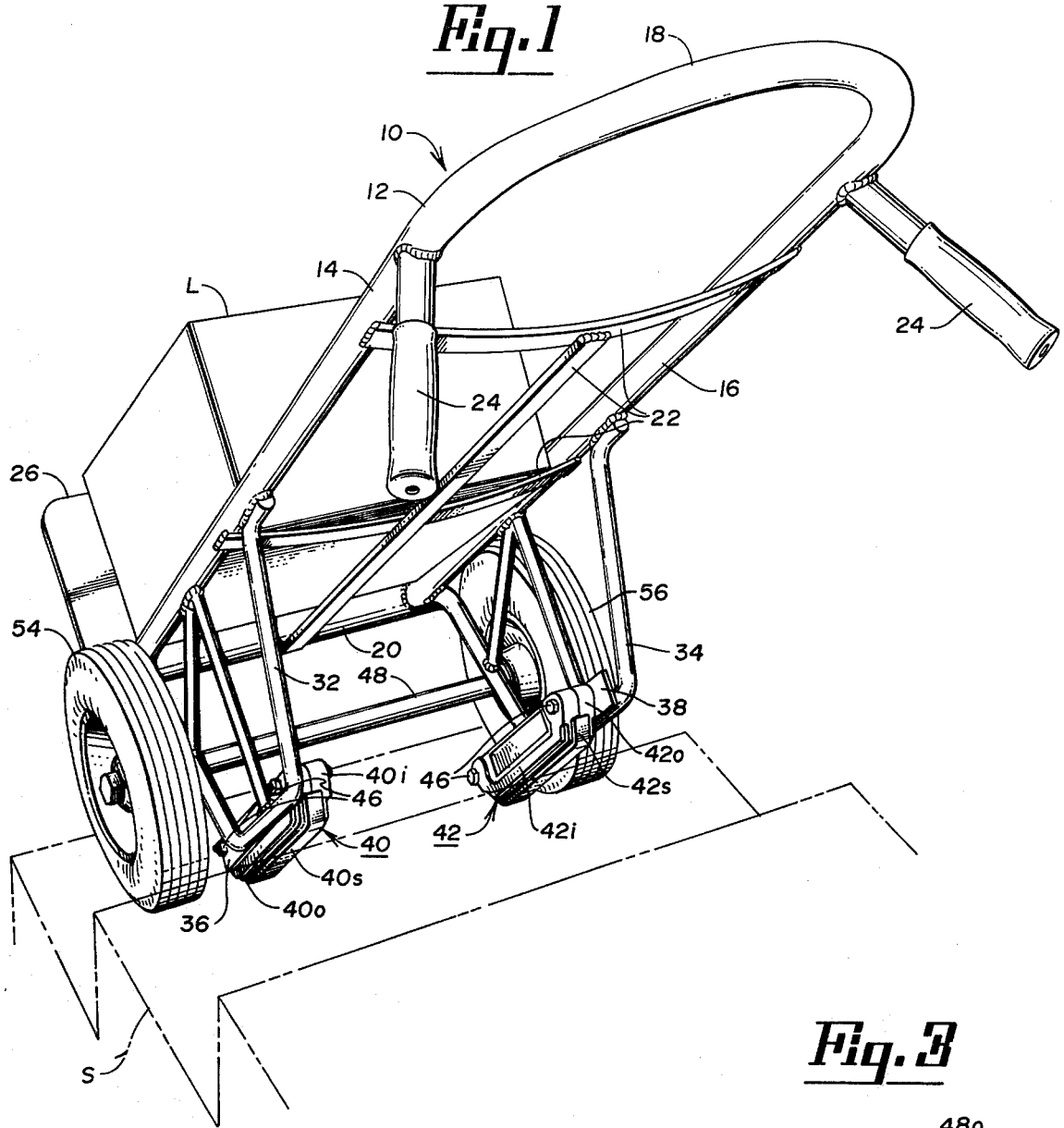
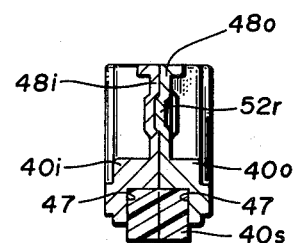
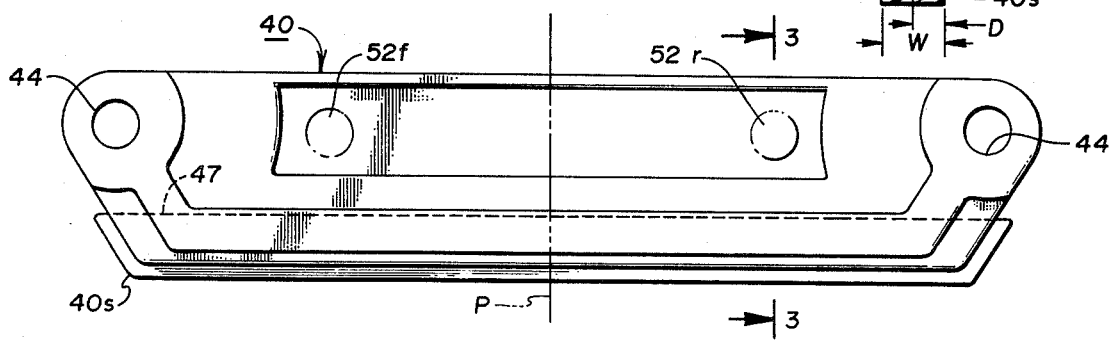

STAIR CLIMBING AND DESCENDING ATTACHMENT FOR A HAND TRUCK

BACKGROUND OF THE INVENTION

1. Field of the Invention

The present invention relates to an attachment for a hand truck and, more particularly, to a stair climbing and descending attachment.

2. Description of the Prior Art

Climbing and descending stairs with a loaded hand truck presents a problem that those skilled in the art have long sought to solve satisfactorily.

One of the most common solutions uses a pair of endless belts that travel on pulleys secured to the truck. The endless belts comprise a kind of conveyor to support the truck on the edge of a stair. The worker moves the truck up or down the stairs by first supporting the truck on the edge of a stair on the belts. As he raises or lowers the truck, the belts travel around the pulleys and "convey" the truck relative to the stair. Variations of the endless belt "conveyor" concept are described in these U.S. Pat. No. 2,467,644 to Wright et al.; No. 2,635,887 to Menne; No. 2,710,195 to Kurth; and No. 2,772,096 to Hanson.

However, none of those prior art solutions are wholly satisfactory. Perhaps their most serious defect is that they all use moving parts. Experience shows that any device having moving parts is more susceptible to breakage than a device without them. Furthermore, moving parts require bearings where they connect to stationary structure, and bearings required periodic lubrication. Thus, those prior art devices are more complex, more expensive to manufacture, and more expensive to maintain than would be the case if they used no moving parts.

U.S. Pat. No. 2,519,113 to Cohn and U.S. Pat. No. 3,788,659 to Allen reveal another approach to the problem. They disclose stationary runners which are secured to the truck. The runners support the truck on the edge of a stair and the truck slides up or down relative to the stair edge on the runners. That approach, however, creates problems, too, even though it eliminates the problems moving parts present. The surfaces of the runners that contact the stair edge are bare metal, which can severely damage unprotected stairs, particularly stairs that are carpeted.

The prior art, then, leaves much room for improvement in stair climbing and descending attachments for hand trucks.

SUMMARY OF THE INVENTION

The object of the present invention is to provide a stair climbing and descending attachment for a hand truck that employs no moving parts, is inexpensive to make and install on the hand truck, requires virtually no maintenance, and will not damage stairs.

In accordance with that and other objects of the invention, a stair climbing and descending attachment for a hand truck comprises a frame means for rigid attachment to the hand truck. A slide means comprised of a low-friction material is secured to the frame means for slidably engaging the edge of a stair.

BRIEF DESCRIPTION OF THE DRAWING

The present invention may be better understood by reference to the following detailed description of the invention and to the drawings, in all of which like numerals refer to like parts, wherein:

FIG. 1 is a pictorial view of a hand truck on which the stair climbing and descending attachment of the present invention is installed.

FIG. 2 is a side view of a detail of the attachment shown in FIG. 1.

FIG. 3 is a section view taken along line 3—3 of FIG. 2.

DETAILED DESCRIPTION OF THE INVENTION

FIG. 1 shows a hand truck of conventional construction. It has a material-supporting rack 10 comprised of a rigid U-shaped member 12 of heavy-duty, thick-walled steel tubing. The legs of the U-shaped member 12 form a pair of upright members 14 and 16, and the bight portion 18 of the U-shaped member 12 secures the upright members 14 and 16 rigidly together at the top end of the rack 10. The rack 10 further includes a steel bar 20 that spans the bottom ends of the upright members 14 and 16. The ends of the steel bar 20 are welded, or otherwise rigidly secured, to the upright members 14 and 16. Several steel straps 22 welded to the upright members 14 and 16, the steel bar 20, and to each other, provide a webbing to support loads narrower than the distance between the upright members 14 and 16. The straps 22 do not provide substantial structural support, although they may be made rigid enough to do so.

Hand grips 24 welded proximate to the top ends of the upright members 14 and 16 provide handles for the user of the truck. The bight portion 18 of the U-shaped member 12 provides an additional handle, if needed. A material-supporting platform 26 is welded to the steel bar 20 and extends outwardly from the front side of the rack 10. The platform 26 is welded to the bottom side of the steel bar 20 to present a flat, unobstructed surface so that a worker can easily slide the platform 26 under the load.

The stair climbing and descending attachment of the present invention comprises a frame means that includes two similar truss members 32 and 34. The truss member 32 includes a bracket 36 welded to it, and the truss member 34 includes an identical bracket 38 welded to it. In the embodiment shown, the truss members 32 and 34 are mirror images of each other.

The attachment of the present invention also comprises two elongated rail members 40 and 42. The rail member 40 includes an inside half 40i and an outside half 40o which capture between them an elongated slide 40s. The rail member 42 also includes an inside half 42i and an outside half 42o which capture between them an elongated slide 42s. The halves 40i, 40o, 42i, and 42o are all substantially identical, as are the slides 40s and 42s. The slides 40s and 42s are made of a durable, yet non-marring and low-friction material such as an ultra-high molecular weight polymer.

FIGS. 2 and 3 show the rail member 40 in detail; of course, the rail member 42 is substantially identical to the rail member 40 and a description of the rail member 40 applies equally to the rail member 42. FIG. 2 is a view looking at the exterior of the outside half 40o of the rail member 40. Bolt means 46 (see FIG. 1) pass through holes 44 to secure the rail member halves 40i and 40o together, to capture the elongated slide 40s between them, and to mount the elongated rail member 40 to bracket 36 (which, of course, has cooperating holes in it). Channels 47 are formed in the interior surface of each half 40i and 40o. The depth D of the channels is slightly less than onehalf the width W of the elongated slide 40s so that the slide is firmly held in place.

As seen best in FIG. 3, the inner half 40i includes a flange 48i and the outer half 40o includes a flange 48o in face-to-face relationship with the flange 48i. Each flange includes keying means comprised of two dimples that insure proper alignment of the halves 40i and 40o. The center of each dimple is equidistant from a plane P transversely bisecting the rail members. The "front" dimple 52f forms an indentation in the face of the flange 48o and the "rear" dimple 52r forms a protrusion in the face of the flange 48o. The halves 40i, 40o, 42i, and 42o, and slides 40s and 42s, are all symmetrical about plane P, except for the fact than one of the dimples in each half member forms a protrusion and one forms an indentation.

A hollow rod 48 spans the truss members 32 and 34. The ends of the rod 48 are welded, or otherwise rigidly secured, to the truss members 32 and 34. The hollow rod 48 forms a hub through which extends an axle connecting the wheels 54 and 56.

The stair climbing and descending attachment of the present invention is mounted to the truck by welding the truss members 32 and 34 to the upright members 14 and 16, respectively. The attachment is easily, quickly and economically constructed and maintained because it comprises only five different parts: the truss member 32, the truss member 34, the identical rail member halves 40i, 40o, 42i, and 42o, the elongated slides 40s and 42s and the hollow rod 48. The owner of a fleet of hand trucks on which the attachment of the present invention is installed need not have a complicated inventory system to insure that a properly configured rail member half or elongated slide is used to replace one that is broken or worn. The keying means and channels in the rail half members insure quick alignment of them and the elongated slides. The symmetry of the rail members eliminates the possibility of improperly mounting them to the truss members. The use of bolts to secure the rail member halves and elongated slides together and to mount them to the truss members makes construction and repair even quicker and easier.

As an alternate embodiment, the stair climbing and descending attachment of the present invention can be attached to the truck independently of the truck wheels. The truss members may be made with "front-to-rear" symmetry, as are the rail member halves and the elongated slides, thus making them interchangeable with each other. If the truss members are interchangeable and the need for a hub for the wheel axle is eliminated, only three different pieces are needed to construct the attachment; two truss members, four rail member halves, and two elongated slides. That embodiment is particularly adapted for installation on existing hand trucks, although the advantage of being able to precisely locate the wheels relative to the surface of the elongated slides is lost.

FIG. 1 shows a load L and stairs S in dotted lines and thus illustrates the use of the present invention. Assuming that the stairs S are being climbed, the worker wheels the hand truck backward toward the first stair. The elongated slides 40s and 42s contact the edge of the stair before the wheels contact the stair riser. When the worker pulls up on the hand grips 24 or the bight portion 18 of the materialsupporting frame 10, the elongated rail members 40 and 42, with the elongated slides 40s and 42s secured to them, form slide means that glide on the edge of the stair. The worker similarly slides the truck over the edge of each stair until he reaches the top.

To descent stairs, the worker approaches them with the hand truck in front of him and allows the wheels to roll slowly over the edge of the top stair until the truck rests on the edge of the top stair on the elongated slides 40s and 42s. The truck descends as it glides on the edge of the stairs. The worker similarly slides the truck over the edge of each stair until he reaches the bottom.

The present invention therefore permits a hand truck to climb or descend stairs without marring or otherwise damaging the stair surfaces. It is economical and durable and can be easily added to hand trucks that have no stair climbing means.

Those skilled in the art will recognize that various modifications can be made to the embodiment described above without departing from the spirit of the invention. For Example, the two truss members 32 and 34 may be bolted to the upright members 14 and 16 rather than welded. As another example, frame means other than the two truss members 32 and 34 and hollow rod 48 may be more desirable in particular applications. In any event, only two specific embodiments of the invention have been described and only a limited number of modifications to those embodiments have been discussed. Those skilled in the art will undoubtedly perceive other embodiments and modifications within the scope of the invention, which is defined and limited solely by the following claims.

We claim:

1. A stair climbing and descending attachment for use with a hand truck to support the hand truck slidably on the edge of a stair, the attachment comprising:
    frame means for rigid attachment to the hand truck; and
    slide means including a low-friction material secured to said frame means for slidably engaging the stair edge;
    said slide means including a pair of elongated rail members secured to said frame means;
    each said elongated rail member including an elongated slide secured thereto, which elongated slide is comprised of said low-friction material for slidably engaging the stair edge;
    said frame means further including two truss members each having one of said elongated rail members secured thereto;
    said elongated rail members being substantially identical and each comprising two substantially identical half members, each of which is symmetrical about a plane bisecting it transversely, secured together with a face of one half member in contact with a face of the other half member to capture one of said elongated slides therebetween; and
    said elongated slides, each of which is symmetrical about a plane bisecting it transversely, being substantially identical.

2. The stair climbing and descending attachment recited in claim 1 wherein said low-friction material is an ultra-high molecular weight polymer.

3. The stair climbing and descending attachment recited in claim 1 wherein:
    said half members each include keying means that form an exception to said symmetry; and
    said keying means includes a protrusion in said face of each said half member located at a predetermined distance from said plane toward one end of said half member and also includes a depression in the same face located the same predetermined distance from said plane toward the other end of said half member.

4. The stair climbing and descending attachment recited to claim 3 wherein said half members each include a channel in said face thereof having a depth slightly less than one-half the width of said elongated slide to capture said elongated slide in the channel formed by securing two of said half members together.

5. A hand truck including the stair climbing and descending attachment recited in claim 1, wherein:
said hand truck includes a U-shaped material-supporting rack having two legs and a bight portion connecting them; and
one of said truss members is secured to each of said legs.

6. The hand truck recited in claim 5 wherein:
said frame means includes a hollow rod rigidly secured to and spanning said truss members; and
said hollow rod comprises a hub through which extends an axle interconnecting the wheels of the hand truck.

* * * * *